No. 701,172.  
A. N. DOW.  
NECKTIE FASTENER.  
(Application filed May 4, 1901.)  
Patented May 27, 1902.
(No Model.)
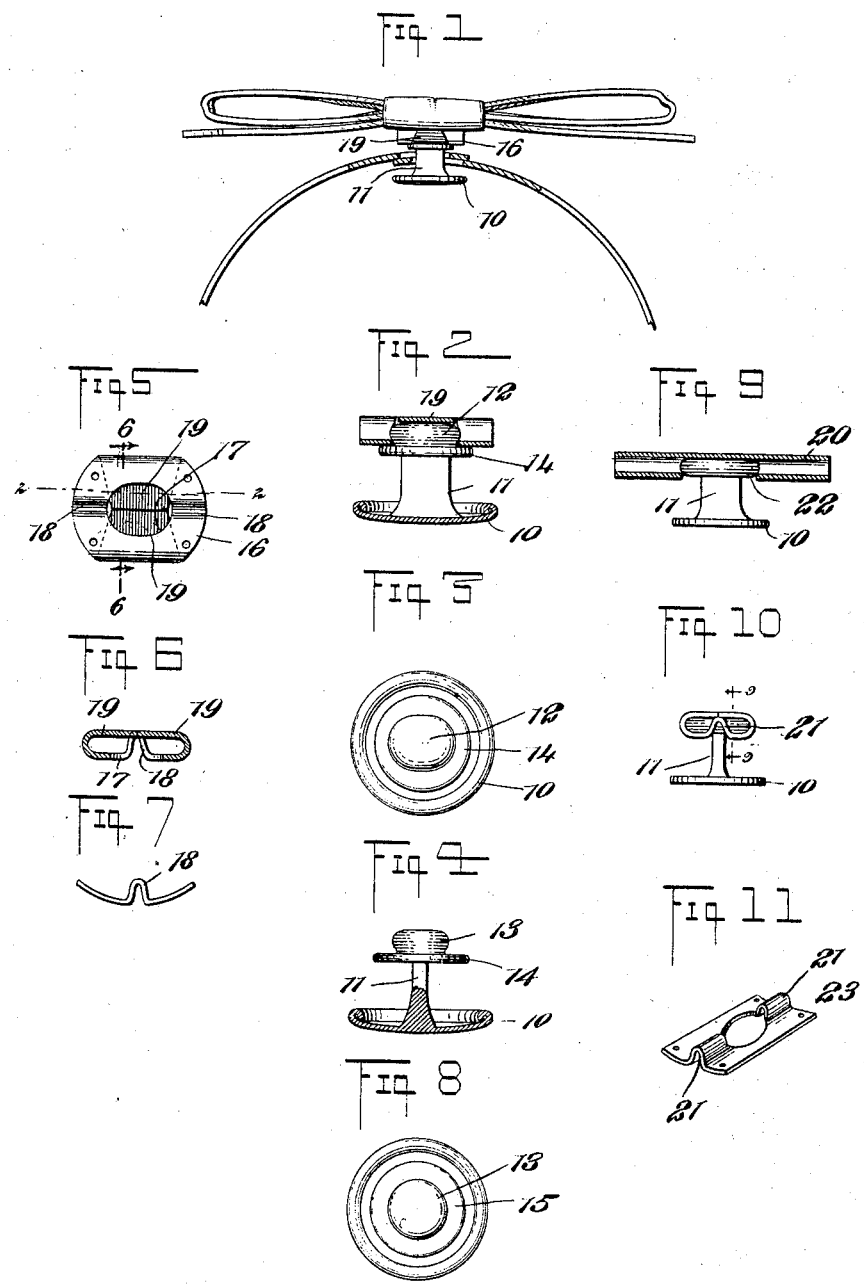
WITNESSES:
INVENTOR  
Albert N. Dow  
BY  
ATTORNEYS

UNITED STATES PATENT OFFICE.

ALBERT NELSON DOW, OF EXETER, NEW HAMPSHIRE.

NECKTIE-FASTENER.

SPECIFICATION forming part of Letters Patent No. 701,172, dated May 27, 1902.

Application filed May 4, 1901. Serial No. 58,730. (No model.)

*To all whom it may concern:*

Be it known that I, ALBERT NELSON DOW, a citizen of the United States, and a resident of Exeter, in the county of Rockingham and State of New Hampshire, have invented a new and Improved Necktie-Fastener, of which the following is a full, clear, and exact description.

This invention relates to improvements in devices for fastening neckties or the like; and the object is to provide a device of very simple construction that will effectually hold a tie or bow of any form and prevent its slipping upward at the front of the collar.

I will describe a necktie-fastener embodying my invention, and then point out the novel features in the appended claims.

Reference is to be had to the accompanying drawings, forming a part of this specification, in which similar characters of reference indicate corresponding parts in all the figures.

Figure 1 is a plan view showing a device embodying my invention as applied to a bow and collar. Fig. 2 is a partial elevation and partial section on the line 2 2 of Fig. 5 of the fastener. Fig. 3 is a top view of the stud member. Fig. 4 is an elevation thereof, partly in section. Fig. 5 is a bottom view of the plate or clip member. Fig. 6 is a section on the line 6 6 of Fig. 5. Fig. 7 is an end view of a modified form of plate employed. Fig. 8 is a top view of a modified form of stud member. Fig. 9 is a partial elevation and partial section on the line 9 9 of Fig. 10 of another modification in the stud and plate members. Fig. 10 is an end elevation thereof, and Fig. 11 is a perspective view of the plate shown in Fig. 7.

The stud member comprises a shoe or base-plate 10 and a shank member 11. This shank member is preferably made flat, as shown, to prevent it from turning in a buttonhole of a collar or neckband. On the end of the shank 11 is a head 12, which in Figs. 2 and 3 is shown as oval in outline. In Figs. 4 and 8, however, I have shown the head 13 as round in contour, and below the head 12 is a collar or base-flange 14.

The plate or clip member is designed to be engaged with the head 12 and against the collar or flange 14. This plate or clip member for this example of my improvement consists of an inner plate 16, provided with an oval opening 17, designed to pass over the head 12 and to provide for a spring-yielding movement of the opposite sides of the plate, so as to pass over the head. The plate 16 at the ends of the opening 17 has longitudinal depressions 18, which project outward or toward the front of the fastener. The sides of the plate 16 are curved outward in the form of flaps 19, which are bent inward or toward each other to engage over the top of the head 12. The plate may be secured to a necktie or bow by threads passing through openings or eyes in the plate.

In the operation of this device when the collar is in place on the button the plate, with the necktie fastened thereto, is to be forced over the head of the button, as clearly indicated in Figs. 1 and 2.

In Figs. 7 and 11 the wings or portions 19 are omitted; otherwise the plate is similar to the plate 16.

In Figs. 9 and 10 I have shown the plate or clip member as of uniform thickness throughout its length or substantially in the form of a flat tube 20, having the inwardly-extended portions 21 at the opposite ends of the opening for receiving the head 22 of the stud member. In this stud member the collar 14 is omitted. This plate or clip member 20 may be formed of a single sheet of metal, at the under side of which are the depressions 21 and the opening, and then the sides are carried over and folded on the top of said depressions, as clearly shown in Fig. 10.

In all the examples of my improvement the essential feature is shown—that is, the depressions or ribs which permit of the springing action of the sides of the plate to pass it over the head of the stud member. The collar 14 will prevent any possibility of the clip member passing too far downward on the shank, especially when the clip member is made in the form shown in Figs. 7 or 11.

Having thus described my invention, I claim as new and desire to secure by Letters Patent—

1. A necktie-fastener, comprising a stud member having a head, and a clip member comprising a plate having an opening through which the head may pass, the said plate being provided at its center with oppositely-arranged depressions extending from the opening to the edges of the plate, whereby the sides of the plate are permitted to spring or move relatively to each other, substantially as specified.

2. In a necktie-fastener, a stud comprising a base-plate, a shank member projecting from the base-plate, a head of oval contour on the other end of the shank, and a collar or flange arranged at the base of the head, and a plate-like clip member apertured to receive the head and provided with a longitudinal depression at each side of the opening and extending to the edge of the plate, substantially as specified.

3. A necktie-fastener, comprising a stud member having a head, and a clip member comprising a plate having an opening to pass over the head, the said plate having oppositely-arranged depressions extending from the opening to the edges of the plate, the sides of said plate being carried outward and then inward toward each other to engage over the outer end of the head, substantially as specified.

4. In a fastening device, the combination with a headed stud, of a plate having an opening through which the head of the stud may pass, and oppositely-arranged depressions on said plate, said depressions extending in a direction across the opening, from the opening to the edge of the plate, substantially as specified.

In testimony whereof I have signed my name to this specification in the presence of two subscribing witnesses.

ALBERT NELSON DOW.

Witnesses:
FLORENCE GRIFFIN DOW,
TRESSIE R. CARROLL.